(12) United States Patent
Kimura et al.

(10) Patent No.: US 10,284,057 B2
(45) Date of Patent: May 7, 2019

(54) STATOR MANUFACTURING DEVICE AND STATOR MANUFACTURING METHOD

(71) Applicant: HONDA MOTOR CO., LTD., Tokyo (JP)

(72) Inventors: Takahiro Kimura, Tochigi (JP); Takeshi Yanagisawa, Tochigi (JP); Hiroyuki Yabe, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 540 days.

(21) Appl. No.: 14/408,095

(22) PCT Filed: Feb. 12, 2013

(86) PCT No.: PCT/JP2013/053246
§ 371 (c)(1),
(2) Date: Dec. 15, 2014

(87) PCT Pub. No.: WO2013/190860
PCT Pub. Date: Dec. 27, 2013

(65) Prior Publication Data
US 2015/0180319 A1  Jun. 25, 2015

(30) Foreign Application Priority Data
Jun. 22, 2012 (JP) ................................. 2012-140639

(51) Int. Cl.
*H02K 15/00* (2006.01)

(52) U.S. Cl.
CPC .... *H02K 15/0087* (2013.01); *Y10T 29/49009* (2015.01); *Y10T 29/53143* (2015.01)

(58) Field of Classification Search
CPC ............. H02K 15/0087; H02K 15/428; H02K 15/0031; Y10T 29/49009; Y10T 29/53143
See application file for complete search history.

(56) References Cited

U.S. PATENT DOCUMENTS

| 2004/0172805 A1* | 9/2004 | Tokizawa ........... H02K 15/0037 29/596 |
| 2013/0000105 A1* | 1/2013 | Hasegawa .......... H02K 15/0428 29/596 |

FOREIGN PATENT DOCUMENTS

| JP | 2000-092797 | 3/2000 | |
| JP | 2002-010585 | 1/2002 | |
| JP | 2003-259612 | 9/2003 | |
| JP | 2004-236375 | 8/2004 | |
| JP | WO 2011111761 A1 * | 9/2011 | ......... H02K 15/0528 |

OTHER PUBLICATIONS

International Search Report, dated May 21, 2013 (May 21, 2013).

* cited by examiner

*Primary Examiner* — Livius Radu Cazan
(74) *Attorney, Agent, or Firm* — Rankin, Hill & Clark LLP

(57) ABSTRACT

A highly versatile stator manufacturing device is provided. A stator manufacturing device 7 includes: an engagement portion 8 engageable with a distal end of an extension portion 5 of each of a plurality of conductor segments 4 extending from a plurality of extension positions that differ in a radial direction R in each slot 3 of a stator core 2; a circumferential direction drive portion 9 that drives the engagement portion 8 engaging with the extension portion 5 in a circumferential direction C, to bend the extension portion 5; and a radial direction drive portion 10 that drives the engagement portion 8 in the radial direction R.

7 Claims, 18 Drawing Sheets

STATOR MANUFACTURING DEVICE AND STATOR MANUFACTURING METHOD

TECHNICAL FIELD

The present invention relates to a stator manufacturing device and a stator manufacturing method for bending extension portions of conductor segments extending from each slot of a ring-shaped stator core.

BACKGROUND ART

The following technique is conventionally known: when manufacturing a stator, conductor segments are inserted into each of a plurality of slots formed in a ring-shaped stator core, and the extension portions of the conductor segments extending from each slot in the axial direction of the stator core are bent and the distal ends of the adjacent extension portions are joined to form a stator coil.

In this case, the extension portions of the conductor segments constitute a conductor layer made up of a plurality of layers that differ in the radial position in the stator core. As a technique of bending the extension portions of the conductor segments, the use of a bending jig formed by concentrically overlaying as many jigs as the layers, i.e. jigs each for bending the extension portions of a different one of the layers, is proposed (for example, see Patent Literature 1).

Each jig constituting the bending jig has a plurality of holes into which the distal ends of the extension portions of the corresponding layer are inserted. By rotating the jig that holds the distal ends of the extension portions in these holes, the extension portions are bent in the circumferential direction of the stator core.

Here, the adjacent jigs are rotated in opposite directions to each other so that a stator coil can be formed by each conductor segment. The corresponding distal ends of the bent extension portions of the conductor segments are welded together to form a stator coil.

CITATION LIST

Patent Literature

Patent Literature 1: Japanese Patent Application Laid-Open No. 2000-92797

SUMMARY OF INVENTION

Technical Problem

The bending jig formed by overlaying as many jigs as the layers of the conductor layer, i.e. jigs each for a different one of the layers, is used in the technique described in Patent Literature 1. In such a case, a different bending jig is needed depending on the number of layers of the conductor layer or the spacing between the layers. Besides, since the diameter of the jig for each layer is uniform in the bending jig, it is structurally impossible to bend the extension portions while widening the spacing between the extension portions adjacent to each other in the radial direction of the stator core. The technique described in Patent Literature 1 therefore lacks versatility.

In view of the problem of the conventional technique stated above, the present invention has an object of providing a highly versatile stator manufacturing device.

Solution to Problem

A stator manufacturing device according to a first aspect of the invention is a stator manufacturing device that bends extension portions of a plurality of conductor segments extending in an axial direction from a slot of a ring-shaped stator core at a plurality of extension positions that differ in a radial direction of the stator core, the stator manufacturing device including: an engagement portion engageable with a distal end of each of the extension portions, at a position corresponding to an extension position of the extension portion in the radial direction; a circumferential direction drive portion that drives the engagement portion engaging with the distal end of the extension portion in a circumferential direction of the stator core, to bend the extension portion; and a radial direction drive portion that drives the engagement portion in the radial direction.

According to the first aspect of the invention, the engagement portion engageable with the distal end of each of the extension portions of the plurality of conductor segments is driven in the radial direction according to the extension position of the extension portion so that the engagement portion can engage with the distal end of each of the extension portions that differ in the extension position in the radial direction. The plurality of extension portions that differ in the extension position in the radial direction can thus be bent using one engagement portion. In addition, changes in the extension positions of the extension portions can be handled.

Therefore, in the case where the device according to the present invention is applied to various stators that differ in the number of extension portions of conductor segments extending from each slot or the extension positions of the extension portions, only the setting values or the like need to be changed, with there being no need to change the components of the device. This contributes to high productivity, with no increase in cost. A highly versatile stator manufacturing device can thus be provided.

Moreover, when the engagement portion is driven in the circumferential direction to bend the extension portion, the engagement portion can also be driven in the radial direction. This enables bending with a larger twist in the radial direction, compared to the case of simply bending the extension portion along the circumferential direction.

A second aspect of the invention is the stator manufacturing device according to the first aspect of the invention, including an axial direction drive portion that drives the engagement portion in the axial direction of the stator core. By driving the engagement portion in the axial direction with the drive amount corresponding to the drive amount of the engagement portion by the circumferential direction drive portion, the extension portion can be bent smoothly while maintaining the constant positional relationship between the engagement portion and the distal end of the extension portion.

A third aspect of the invention is the stator manufacturing device according to the first or second aspect of the invention, wherein the radial direction drive portion includes: a guide portion that guides the engagement portion movably in the radial direction; a follower portion fixed to the engagement portion; and a rotary portion supported rotatably in the circumferential direction of the stator core, and wherein the rotary portion has a circular arc cam surface that, when the rotary portion is rotated, acts on the follower portion of the engagement portion to apply a drive force in the radial direction to the engagement portion.

In the case where a plurality of extension portions are bent all at once using a plurality of engagement portions, only the corresponding number of circular arc cam surfaces or the like need to be provided, with there being no need to provide a drive mechanism for each engagement portion. Hence, the radial direction drive portion can be realized with a compact and simple structure.

A fourth aspect of the invention is the stator manufacturing device according to any of the first to third aspect of the inventions, wherein the engagement portion includes: an engagement distal end that engages with the distal end of the extension portion; and a distal end support portion that supports the engagement distal end replaceably. This eases the replacement of the distal end of the engagement portion which is prone to wear.

A fifth aspect of the invention is the stator manufacturing device according to any of the first to fourth aspect of the inventions, including: a proximal end support member that is placed on an end surface of the stator core, and supports a proximal end of the extension portion when the extension portion is bent; and a support member drive portion that drives the proximal end support member in the radial direction between a support position for supporting the proximal end of the extension portion and a predetermined retraction position. This eases the placement of the proximal end support member at the support position, regardless of the shape of the conductor segment extending from each slot.

A stator manufacturing method according to a sixth aspect of the invention is a stator manufacturing method for bending a first extension portion and a second extension portion of conductor segments extending in an axial direction of a ring-shaped stator core respectively from a first extension position and a second extension position that differ in a radial direction of the stator core, in a slot formed in the stator core, the stator manufacturing method including: a first bending step of engaging an engagement portion with a distal end of the first extension portion, and driving the engagement portion in one direction along a circumferential direction of the stator core to bend the first extension portion in the one direction, the engagement portion being engageable with a distal end of each of the first extension portion and the second extension portion when situated at a position in the radial direction corresponding to a corresponding one of the first extension position and the second extension position; a radial drive step of, after the first bending step, driving the engagement portion in the radial direction to a position corresponding to the second extension position; and a second bending step of, after the radial drive step, engaging the engagement portion with a distal end of the second extension portion, and driving the engagement portion in an opposite direction to the one direction to bend the second extension portion in the opposite direction.

According to the sixth aspect of the invention, the engagement portion is engaged with the distal end of the first extension portion, and driven in one direction along the circumferential direction to bend the first extension portion. After this, the engagement portion is driven in the radial direction to the position corresponding to the second extension position to engage with the distal end of the second extension portion, and driven in the opposite direction to bend the second extension portion in the opposite direction. The first extension portion and the second extension portion can thus be bent using the same engagement portion. In addition, the case of manufacturing various stators that differ in the first extension position and/or the second extension position can be handled.

Therefore, in the case where the method according to the present invention is applied to various stators that differ in the number of extension portions of conductor segments extending from each slot or the extension positions of the extension portions, only the setting values or the like need to be changed, with there being no need to change the components of the device for implementing the method. This contributes to high productivity, with no increase in cost. A highly versatile stator manufacturing method can thus be provided.

DESCRIPTION OF EMBODIMENTS

Figure 1:
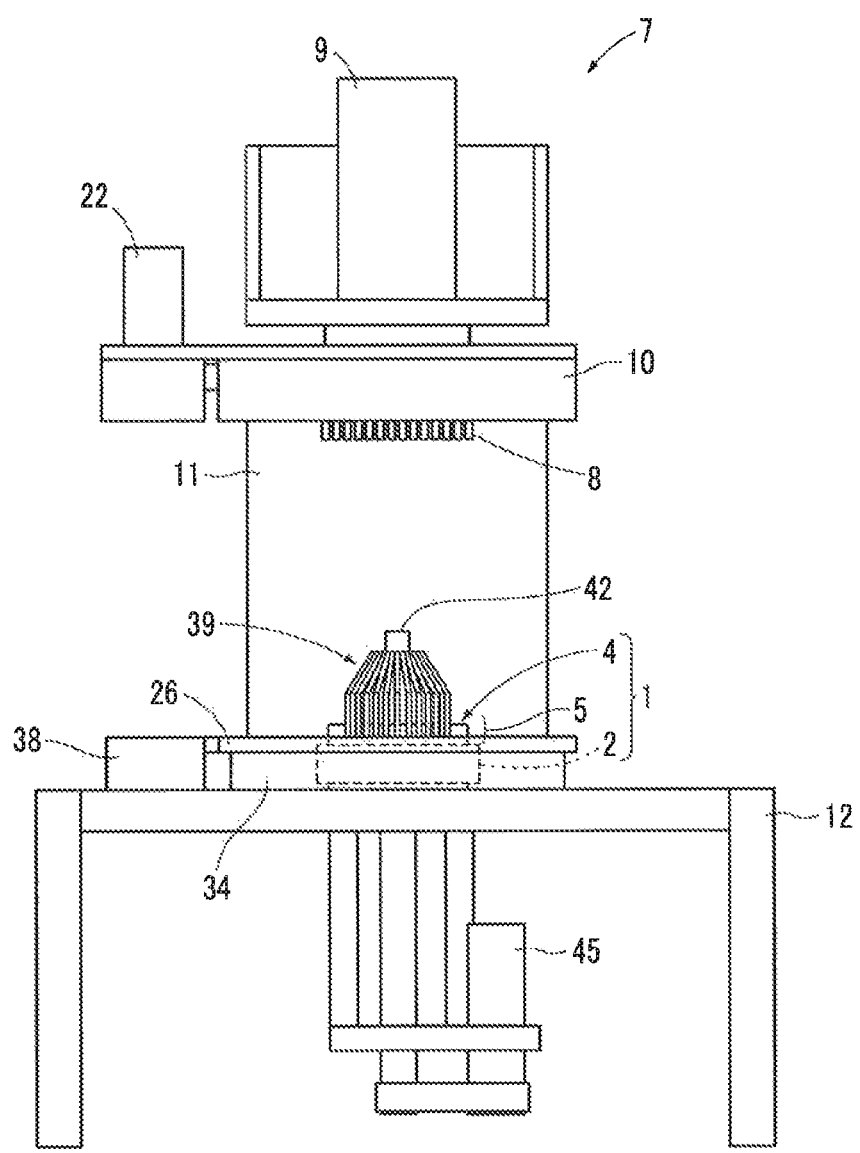
FIG. 1 is a front view of a stator manufacturing device according to an embodiment of the present invention.
Figure 2:
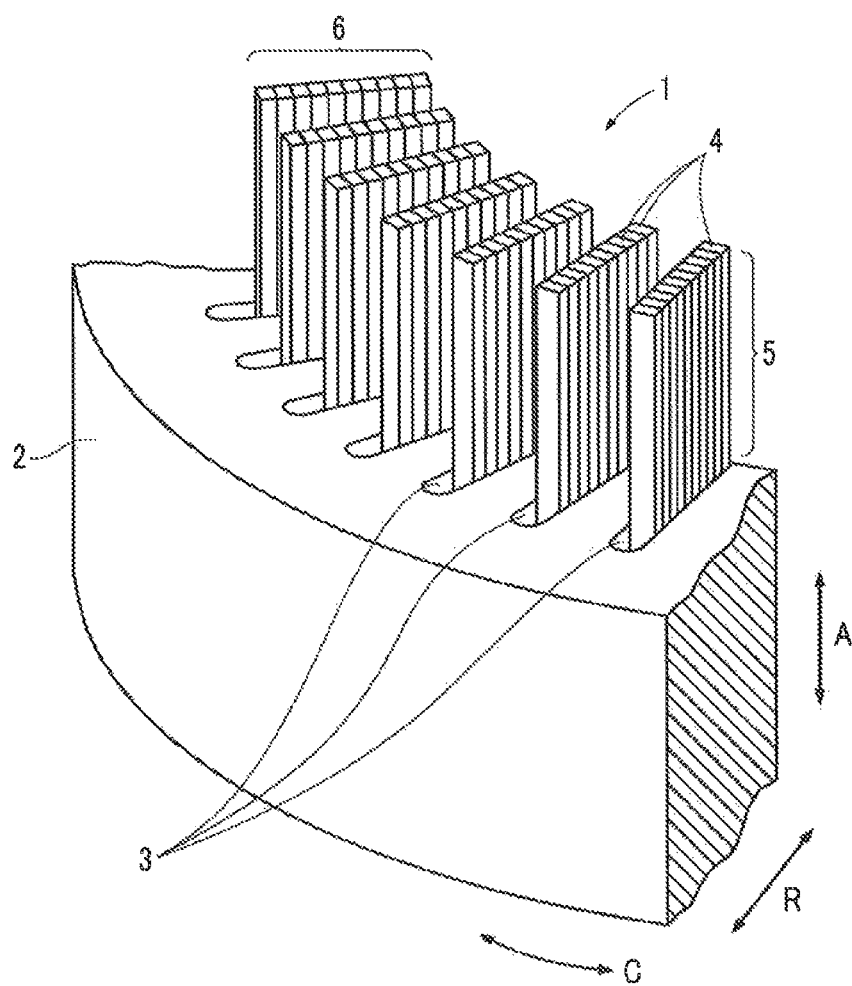
FIG. 2 is a perspective view showing a part of a workpiece processed by the stator manufacturing device in FIG. 1.

The following describes an embodiment of the present invention with reference to drawings. FIG. 1 is a front view of a stator manufacturing device according to the embodiment. FIG. 2 is a perspective view showing a part of a workpiece of a stator subjected to a bending process by the stator manufacturing device.

As shown in FIG. 2, in a workpiece 1 subjected to the bending process, a plurality of conductor segments 4 for forming a stator coil are inserted in each slot 3 of a ring-shaped stator core 2. The ends of the respective conductor segments 4 extend from each slot 3, in the axial direction A of the stator core 2. Extension portions 5 which are the extending parts of the respective conductor segments 4 constitute a conductor layer 6 made up of a plurality of layers that differ in the position in the radial direction R of the stator core 2.

Each layer constituting the conductor layer 6 is made up of extension portions 5 that have the same position in the radial direction R in the respective slots 3. In other words, as many extension portions 5 as the layers constituting the conductor layer 6 extend from each slot 3, at extension positions that differ in the radial direction R.

In the bending process by the stator manufacturing device, the extension portions 5 of the conductor segments 4 extending from each slot 3 of the stator core 2 are bent in the circumferential direction C of the stator core 2. This bending process is performed for each layer (hereafter referred to as "processing layer") constituting the conductor layer 6. In the bending process for each processing layer, all extension portions 5 belonging to the processing layer are bent simultaneously.

As shown in FIG. 1, a stator manufacturing device 7 according to the embodiment includes: a plurality of engagement portions 8 engageable with the distal ends of extension portions 5; and a circumferential direction drive portion 9, a radial direction drive portion 10, and an axial direction drive portion 11 that move each engagement portion 8 respectively in the circumferential direction C, the radial direction R, and the axial direction A (see FIG. 2) of the stator core 2 in the workpiece 1 set in the stator manufacturing device 7.

The number of engagement portions 8 is the same as the number of slots 3 so that, for each processing layer constituting the conductor layer 6 (see FIG. 2), the bending process is performed on all extension portions 5 belonging to the processing layer at once, and all engagement portions 8 are driven simultaneously in the same manner.

The radial direction drive portion 10 drives each engagement portion 8 in the radial direction R according to the extension position, in the radial direction R, of the extension portion 5 to be engaged with the engagement portion 8. The circumferential direction drive portion 9 holds the radial direction drive portion 10, and rotates the radial direction drive portion 10 in the circumferential direction C. In this way, the circumferential direction drive portion 9 drives each engagement portion 8 engaging with the distal end of the corresponding extension portion 5 in the circumferential direction C, thereby bending each extension portion 5 in the circumferential direction C.

The axial direction drive portion 11 is provided on a frame 12 of the device, and holds the circumferential direction drive portion 9 and drives the circumferential direction drive portion 9 in the axial direction A. In this way, the axial direction drive portion 11 drives each engagement portion 8 in the axial direction A. When the circumferential direction drive portion 9 drives each engagement portion 8 in the circumferential direction C to bend each extension portion 5, the axial direction drive portion 11 drives each engagement portion 8 in the axial direction A with the drive amount corresponding to the drive amount in the circumferential direction C.

Figure 3:
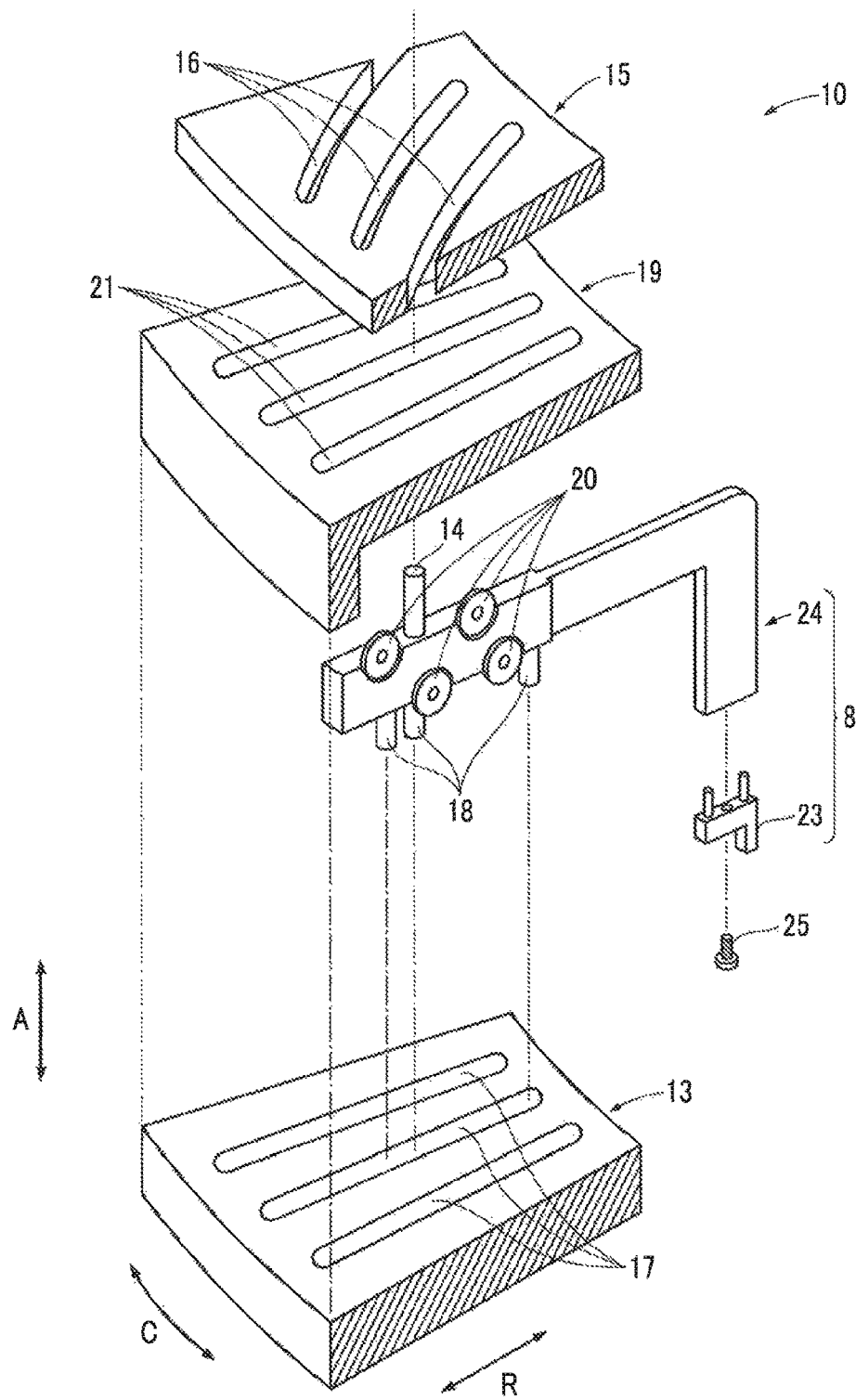
FIG. 3 is an exploded view showing a chief part of a radial direction drive portion in the device in FIG. 1.

FIG. 3 is an exploded view showing a chief part of the radial direction drive portion 10. As shown in FIG. 3, the radial direction drive portion 10 includes: a guide portion 13 that guides each engagement portion 8 movably in the radial direction R; a follower portion 14 fixed to each engagement portion 8; and a rotary portion 15 supported rotatably in the circumferential direction C. The rotary portion 15 has as many cam grooves 16 as the engagement portions 8. The cam grooves 16 each have a circular arc cam surface that, when the rotary portion 15 is rotated, acts on the follower portion 14 of the corresponding engagement portion 8 to apply a drive force in the radial direction R to the engagement portion 8.

The guide portion 13 has as many guide grooves 17 as the engagement portions 8, where each guide groove 17 is long in the radial direction R. Each engagement portion 8 has three guide pins 18 that are inserted into the corresponding guide groove 17 in the axial direction A. Each engagement portion 8 is guided in the radial direction R by the guide portion 13, via the guide pins 18 and the corresponding guide groove 17.

A spacer 19 is placed between the guide portion 13 and the rotary portion 15. The spacer 19 is fixed to the guide portion 13 so that one surface of the spacer 19 perpendicular to the axial direction A faces one surface of the guide portion 13 and a space in which each engagement portion 8 moves in the radial direction R is formed between the facing surfaces. Each engagement portion 8 has rollers 20 that roll on each of the facing surfaces to enable smooth movement in the radial direction R between the facing surfaces.

The spacer 19 has as many through grooves 21 as the guide grooves 17 at the positions corresponding to the guide grooves 17 of the guide portion 13, where each through groove 21 is long in the radial direction R and goes entirely through the spacer 19 in the axial direction A. The follower portion 14 of each engagement portion 8 is inserted into the corresponding cam groove 16 of the rotary portion 15 in the axial direction A, via the corresponding through groove 21. The follower portion 14 does not contact the through groove 21.

The rotary portion 15 is rotated in the circumferential direction C via a timing pulley or a timing belt, by a motor 22 (see FIG. 1) fixed in position to the guide portion 13 and the spacer 19. When the rotary portion 15 is rotated in the circumferential direction C, each cam groove 16 of the rotary portion 15 acts on the follower portion 14 of the corresponding engagement portion 8.

As a result, each engagement portion 8 is driven in the radial direction R along the corresponding guide groove 17 of the guide portion 13. When the rotary portion 15 is rotated in the opposite direction in the circumferential direction C, each engagement portion 8 is driven in the opposite direction in the radial direction R.

Each engagement portion 8 includes: an engagement distal end 23 engageable with the distal end of the corresponding extension portion 5 (see FIG. 2); and a distal end support portion 24 that supports the engagement distal end 23 replaceably. The engagement distal end 23 is replaceably attached to the distal end support portion 24 by a screw 25.

Figure 4:
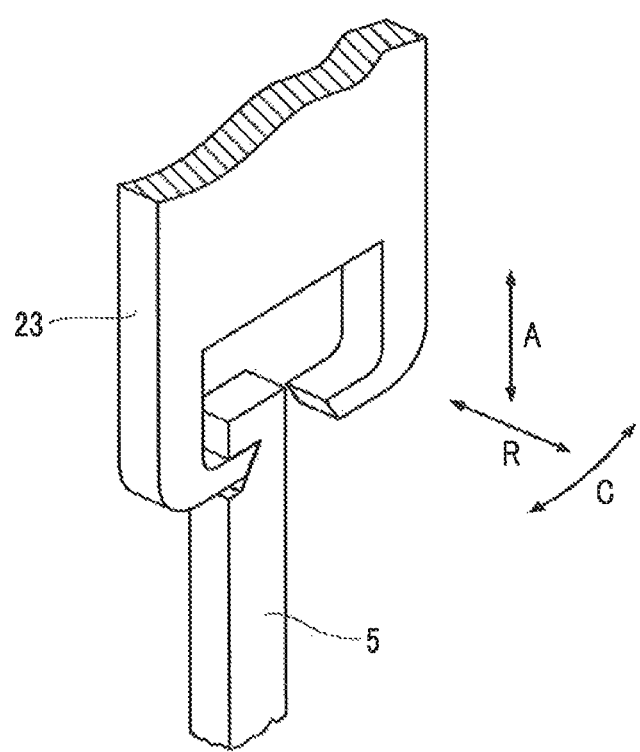
FIG. 4 is a view showing an example of a state where an engagement distal end of an engagement portion in the device in FIG. 1 engages.

FIG. 4 shows an example of a state where the engagement distal end 23 engages with the distal end of the corresponding extension portion 5. In this example, the engagement distal end 23 has a clawlike tip, and the distal end of the extension portion 5 has a depression corresponding to the clawlike tip.

When the engagement distal end 23 is driven in the circumferential direction C, the clawlike tip of the engagement distal end 23 engages with the depression at the distal end of the extension portion 5, to apply a bending force to the extension portion 5. Thus, the engagement portion 8 is engageable with the distal end of the extension portion 5, when situated at the position corresponding to the extension position of the extension portion 5 in the radial direction R.

As shown in FIG. 1, the stator manufacturing device 7 includes a proximal end support mechanism 26 that supports the proximal end of each extension portion 5 when the extension portion 5 is bent. When each extension portion 5 is bent, the proximal end support mechanism 26 prevents the proximal end of the extension portion 5 from being damaged by the edge parts where the end surface of the stator core 2 and the inner wall of the slot 3 intersect, and allows the extension portion 5 to smoothly bend in the circumferential direction C at the proximal end.

Figure 5:
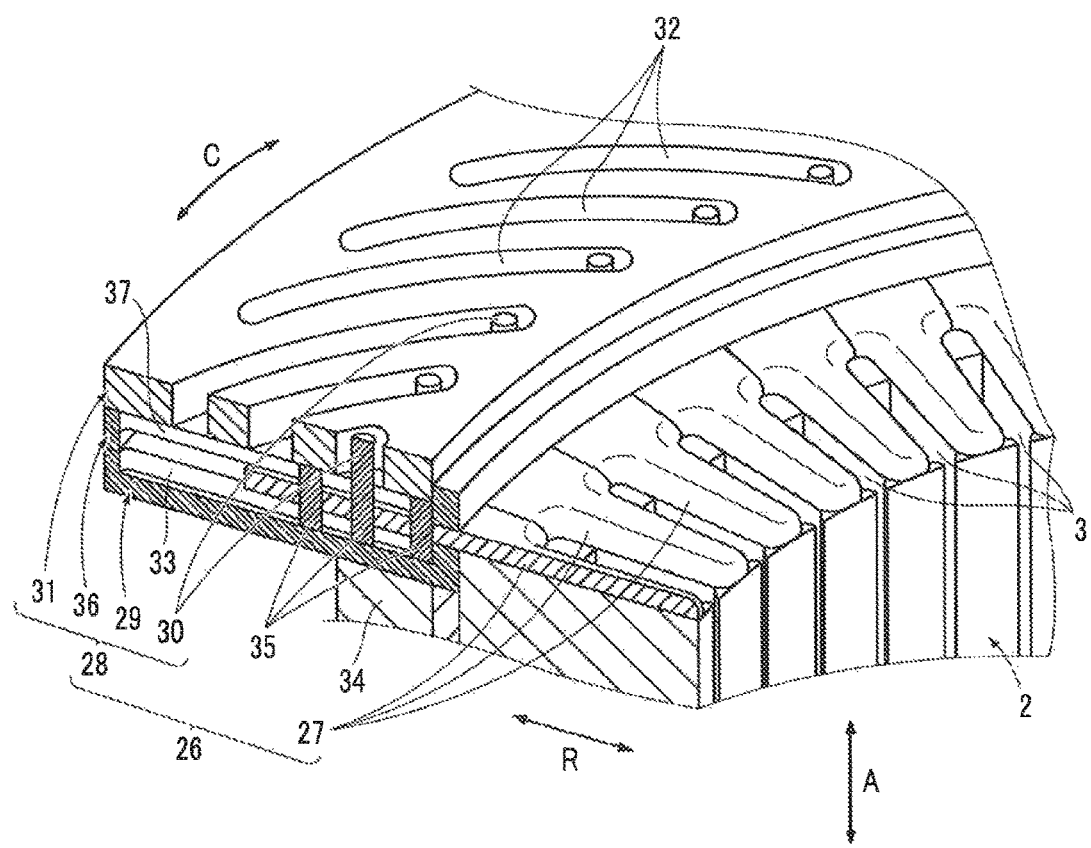
FIG. 5 is a perspective view showing a chief part of a proximal end support mechanism in the device in FIG. 1.

FIG. 5 is a perspective view showing a chief part of the proximal end support mechanism 26. The extension portions 5 are not shown in FIG. 5. As shown in FIG. 5, the proximal end support mechanism 26 is placed on the end surface of the stator core 2, and includes: a proximal end support member 27 that supports the proximal end of the corresponding extension portion 5 when each extension portion 5 (see FIG. 2) is bent; and a support member drive portion 28 that drives the proximal end support member 27 in the radial direction R between a support position for supporting the proximal end of the extension portion 5 and a predetermined retraction position.

The support member drive portion 28 has the same structure as the above-mentioned radial direction drive portion 10. The support member drive portion 28 drives the proximal end support member 27 in the radial direction R, in the same manner as the radial direction drive portion 10 driving the engagement portion 8. The number of proximal end support members 27 is the same as the number of slots 3, and all proximal end support members 27 are driven simultaneously in the same manner.

In detail, the support member drive portion 28 includes: a guide portion 29 that guides each proximal end support member 27 movably in the radial direction R; a follower portion 30 fixed to each proximal end support member 27; and a rotary portion 31 supported rotatably in the circumferential direction C. The rotary portion 31 has as many circular arc cam grooves 32 as the proximal end support members 27. When the rotary portion 31 is rotated, the cam grooves 32 each act on the follower portion 30 of the corresponding proximal end support member 27 to apply a drive force in the radial direction R to each proximal end support member 27.

The guide portion 29 has as many guide grooves 33 as the proximal end support members 27, where each guide groove 33 is long in the radial direction R. The guide portion 29 is fixed to a work support portion 34. Each proximal end support member 27 has three guide pins 35 that are inserted into the corresponding guide groove 33 in the axial direction A. Each proximal end support member 27 is guided in the radial direction R by the guide portion 29, via the guide pins 35 and the corresponding guide groove 33.

A spacer 36 is placed between the guide portion 29 and the rotary portion 31. The spacer 36 is fixed to the guide portion 29 so that one surface of the spacer 36 perpendicular to the axial direction A faces one surface of the guide portion 29 and a space in which each proximal end support member 27 moves in the radial direction R is formed between the facing surfaces.

The spacer 36 has as many through grooves 37 as the guide grooves 33 at the positions corresponding to each guide grooves 33 of the guide portion 29, where each through groove 37 is long in the radial direction R and goes entirely through the spacer 36 in the axial direction A. The follower portion 30 of each proximal end support member 27 is inserted into the corresponding cam groove 32 of the rotary portion 31 in the axial direction A, via the corresponding through groove 37. The follower portion 30 does not contact the through groove 37.

The rotary portion 31 is rotated in the circumferential direction C via a timing pulley or a timing belt, by a motor 38 (see FIG. 1) fixed to the frame 12. When the rotary portion 31 is rotated in the circumferential direction C, each cam groove 32 of the rotary portion 31 acts on the follower portion 30 of the corresponding proximal end support member 27, to drive the proximal end support member 27 in the radial direction R along each guide groove 33 of the guide portion 29.

As shown in FIG. 1, the stator manufacturing device 7 further includes: a work support portion 34 that supports the workpiece 1 in FIG. 2; and an expansion portion 39 that presses an intermediate portion between the proximal end and the distal end of each extension portion 5 bent by the circumferential direction drive portion 9 from inside in the radial direction R to expand the extension portion 5 outward. The work support portion 34 is provided on the frame 12.

Figure 6:
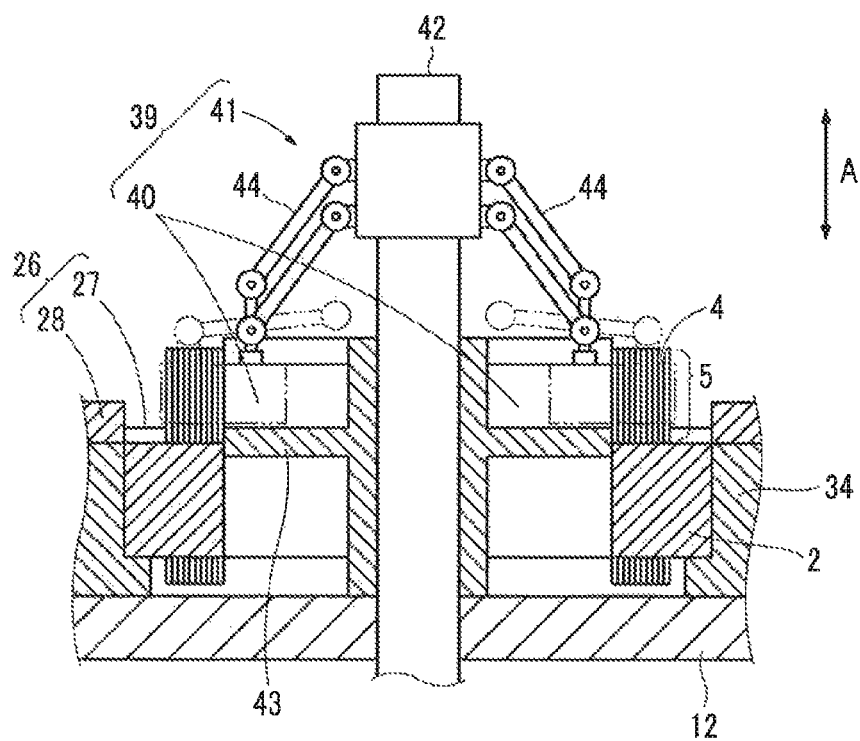
FIG. 6 is a sectional view showing a chief part of an expansion portion in the device in FIG. 1.

FIG. 6 is a sectional view showing a chief part of the expansion portion 39. As shown in FIG. 6, the expansion portion 39 includes: a pressing member 40 that presses the intermediate portion of each extension portion 5; and a pressing member drive portion 41 that drives the pressing member 40 in the radial direction R. The number of pressing members 40 is the same as the number of slots 3 (see FIG. 2). The pressing member drive portion 41 drives the pressing member 40 in the radial direction R, in the space between the extension portions 5 extending from the slots 3. Here, the pressing member drive portion 41 drives all pressing members 40 in the radial direction R simultaneously in the same manner.

The pressing member drive portion 41 includes: an elevation shaft 42 driven in the axial direction A; a metal guide 43 fixed to the frame 12; and a link mechanism 44 situated between the elevation shaft 42 and each pressing member 40. The number of link mechanisms 44 is the same as the number of pressing members 40. The elevation shaft 42 is driven in the axial direction A via a timing pulley, a timing belt, a ball screw, or the like, by a motor 45 shown in FIG. 1. The metal guide 43 guides each pressing member 40 movably in the radial direction R.

Each link mechanism 44 converts the movement of the elevation shaft 42 in the axial direction A, to the movement of the corresponding pressing member 40 in the radial direction R as guided by the metal guide 43. The expansion portion 39 expands the intermediate portion of each bent extension portion 5, by this movement of the pressing member 40.

Figure 7:
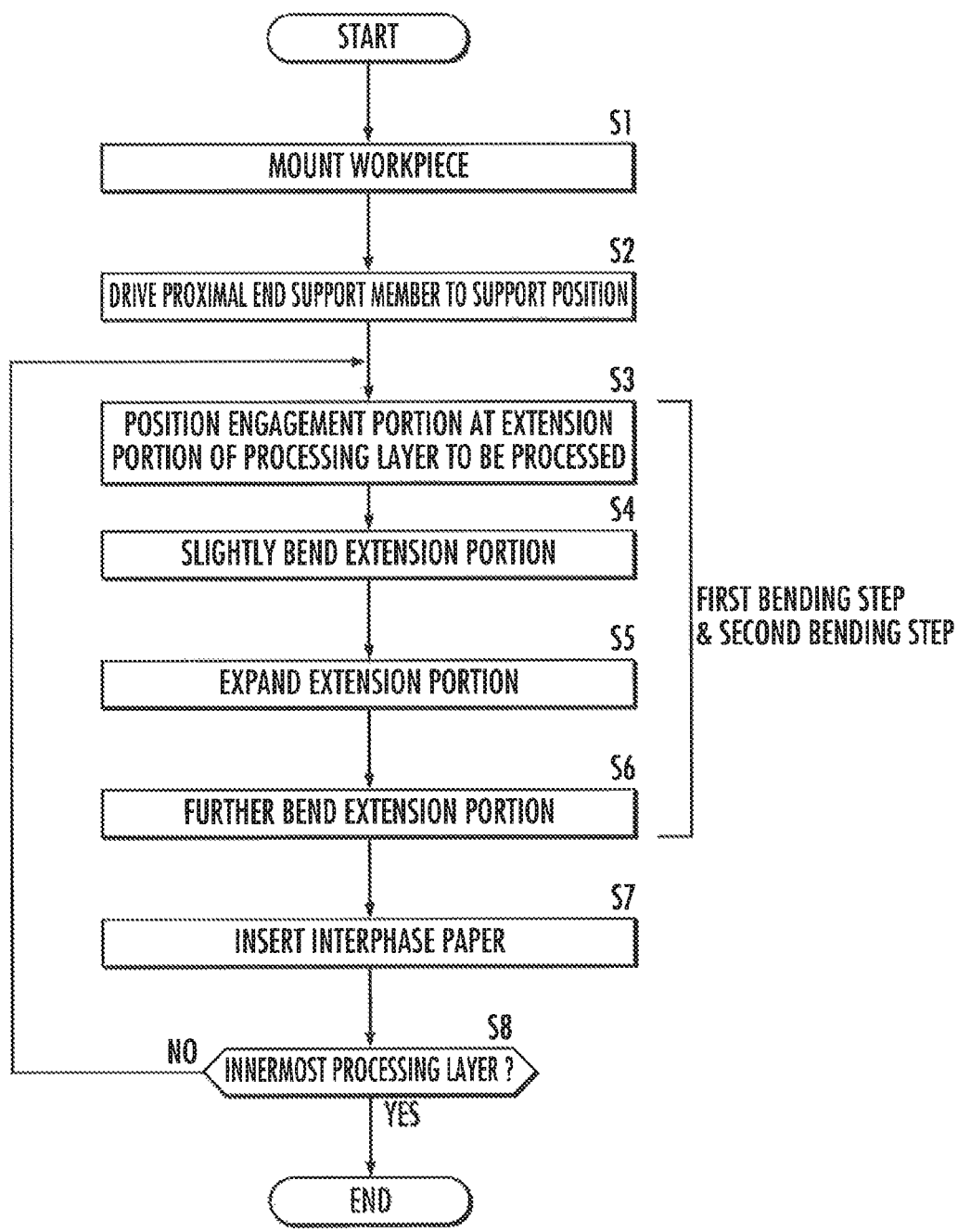
FIG. 7 is a flowchart showing steps of a bending process by the device in FIG. 1.

FIG. 7 is a flowchart showing the steps of the bending process by the stator manufacturing device 7. As shown in FIG. 7, in the bending process, first the workpiece 1 to be processed is mounted in the stator manufacturing device 7 (step S1).

The workpiece 1 is mounted by the work support portion 34 supporting the workpiece 1. In the workpiece 1, the conductor segments 4 are inserted in each slot 3 of the stator core 2, and the extension portions 5 form the conductor layer 6, as shown in FIG. 2.

Next, in the proximal end support mechanism 26, the support member drive portion 28 drives each proximal end support member 27 from the predetermined retraction position to the support position inward in the radial direction R (step S2). As a result, each proximal end support member 27 is placed at the position capable of supporting the proximal end of the corresponding extension portion 5, as shown in FIG. 5.

Next, the positioning of the engagement portion 8 in step S3 and the bending step in steps S4 to S7 are performed the same number of times as the number of processing layers constituting the conductor layer 6. The bending step is performed once to bend all extension portions 5 of one processing layer. The processing layers constituting the conductor layer 6 sequentially undergo the bending step in the order from the outermost processing layer to the innermost processing layer for each processing layer.

Figure 8:
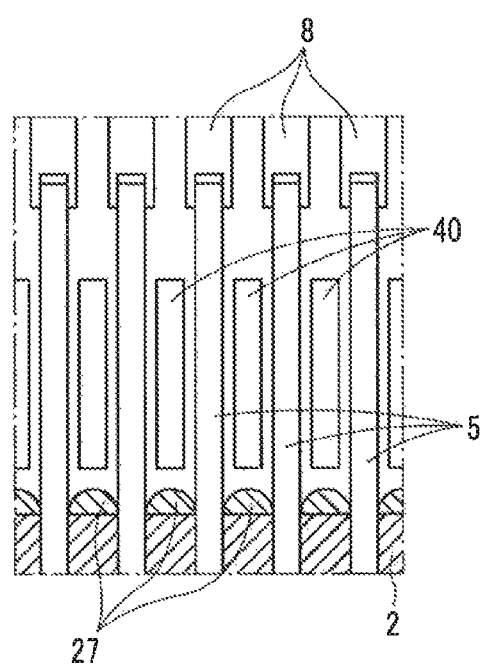
FIG. 8 is a view showing a state where each engagement portion is positioned at the corresponding extension portion in the process in FIG. 7.

In detail, in step S3, the axial direction drive portion 11, the radial direction drive portion 10, and the like position the engagement portions 8 with respect to the extension portions 5 belonging to one processing layer subjected to the current bending step, as shown in FIG. 8.

Upon the positioning, the radial direction drive portion 10 drives each engagement portion 8 in the radial direction R to the position in the radial direction R corresponding to the extension position of the corresponding extension portion 5 (radial drive step). Here, the circumferential direction drive portion 9 or the axial direction drive portion 11 drives each engagement portion 8 in the circumferential direction C or the axial direction A according to need.

In step S4, each extension portion 5 is slightly bent. In detail, the circumferential direction drive portion 9 and the axial direction drive portion 11 drive each engagement portion 8 in the circumferential direction C and the axial direction A. At the start of driving each engagement portion 8, the engagement distal end 23 of each engagement portion 8 engages with the distal end of the corresponding extension portion 5, as shown in FIG. 4. Each engagement portion 8 is driven so that the positional relationship between each engagement portion 8 and the distal end of the extension portion 5 engaging with the engagement portion 8 is held constant and the state of engagement is maintained. Each engagement portion 8 is also driven so that the position of the distal end of each extension portion 5 in the circumferential direction C is moved from its initial position by about half the spacing between the adjacent slots 3.

Figure 9:
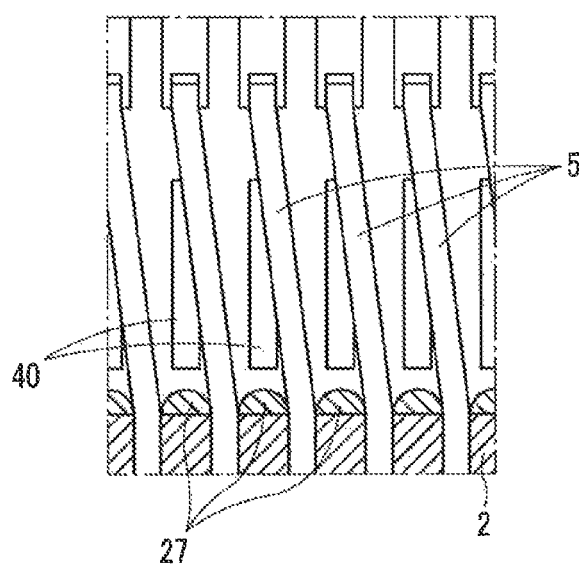
FIG. 9 is a view showing a state where each extension portion is slightly bent in the process in FIG. 7.
Figure 11A:
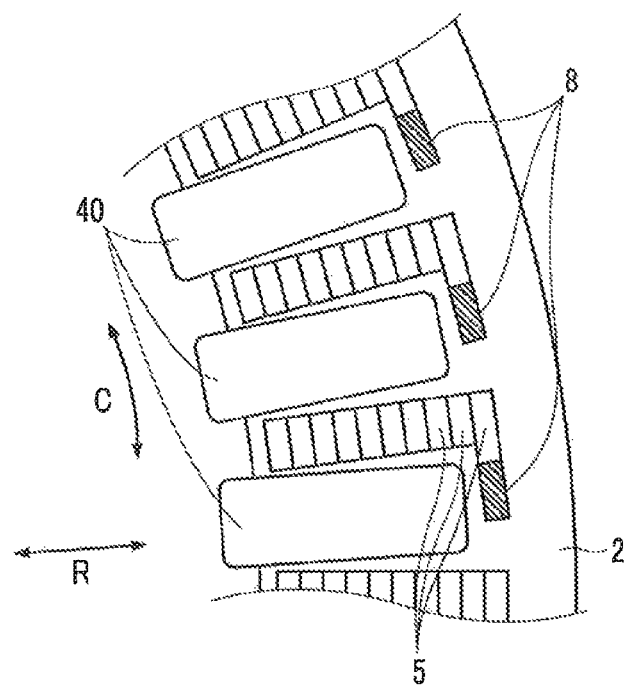
FIG. 11A and FIG. 11B are views schematically showing the state in FIG. 9 as seen in each of the axial direction and the circumferential direction.
Figure 11B:
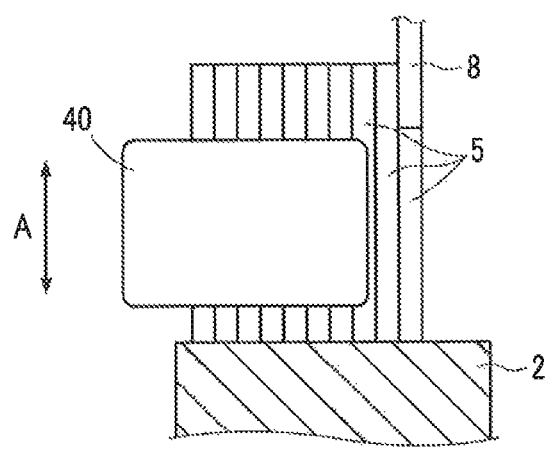

As a result, each extension portion 5 is slightly bent as shown in FIG. 9. FIGS. 11A and 11B schematically show this state as seen in the axial direction A and the circumferential direction C, respectively.

Figure 12A:
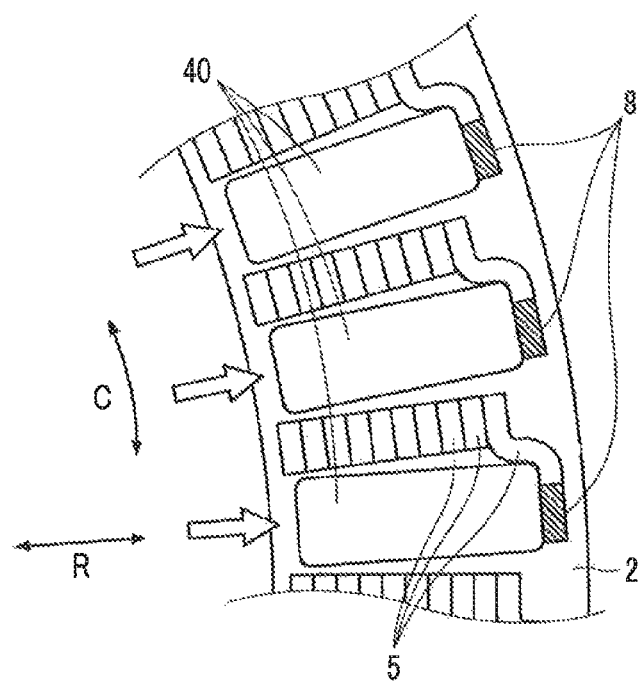
FIG. 12A and FIG. 12B are views showing a state where each slightly bent extension portion in FIG. 9 is expanded.
Figure 12B:
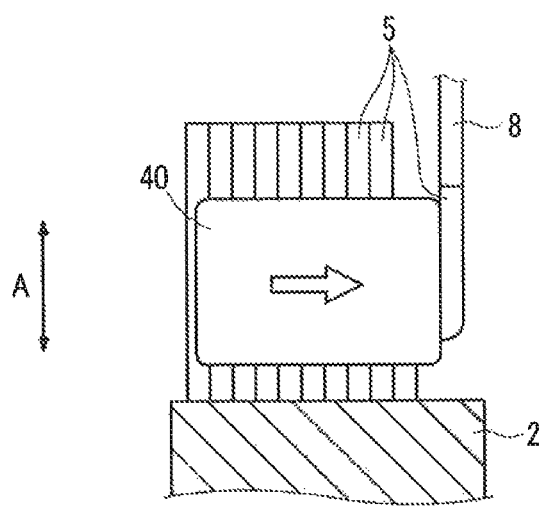

In step S5, the expansion step of pressing each extension portion 5 bent in step S4 from inside in the radial direction R to expand the extension portion 5 outward is performed. In detail, in the expansion portion 39, the elevation shaft 42 is driven in the axial direction A, and each pressing member 40 is moved to a predetermined position outward in the radial direction R. Synchronously with this drive, the radial direction drive portion 10 drives each engagement portion 8 outward in the radial direction R so that its engagement with the distal end of the corresponding extension portion 5 is maintained. As a result, each extension portion 5 slightly bent in step S4 is expanded outward in the radial direction R, as shown in FIG. 12 as an example.

In step S6, each extension portion 5 is further bent. In detail, while each pressing member 40 is kept at the above-mentioned predetermined position, the circumferential direction drive portion 9 and the axial direction drive portion 11 further drive each engagement portion 8 in the circumferential direction C and the axial direction A, respectively.

Each engagement portion 8 is driven so that the positional relationship between each engagement portion 8 and the distal end of the extension portion 5 engaging with the engagement portion 8 is held constant and the state of engagement is maintained. Each engagement portion 8 is also driven so that the position of the distal end of each extension portion 5 in the circumferential direction C is moved in the circumferential direction C from the initial position in FIG. 8 by about three times the spacing between the adjacent slots 3.

Figure 10:
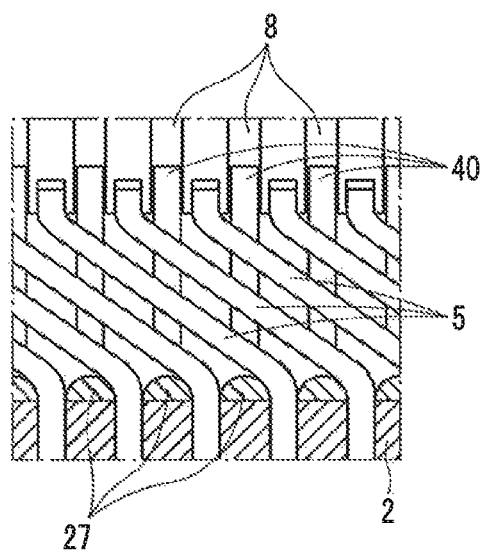
FIG. 10 is a view showing a state where each extension portion is greatly bent in the process in FIG. 7.
Figure 13A:
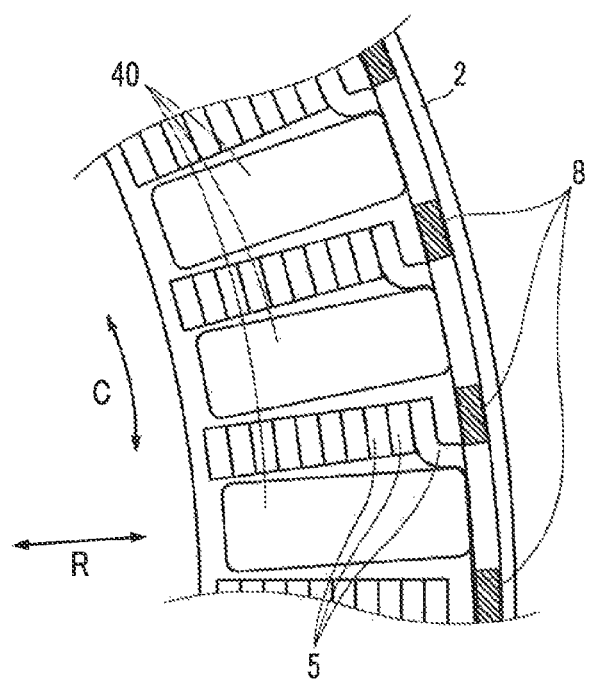
FIG. 13A and FIG. 13B are views schematically showing the state in FIG. 10 as seen in each of the axial direction and the circumferential direction.
Figure 13B:
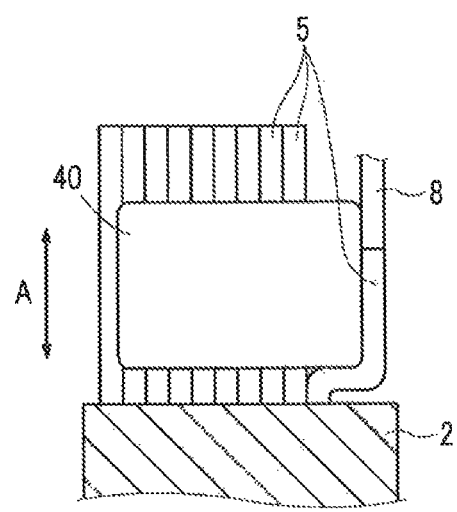

Here, each extension portion 5 bends along the outer end surface of the corresponding pressing member 40 in the radial direction R, while being expanded outward in the radial direction R by the end surface. FIG. 10 shows an example of the resulting state of each extension portion 5 as seen in the radial direction R. FIG. 13 shows an example of the resulting state of each extension portion 5 as seen in each of the axial direction A and the circumferential direction C.

Figure 14A:
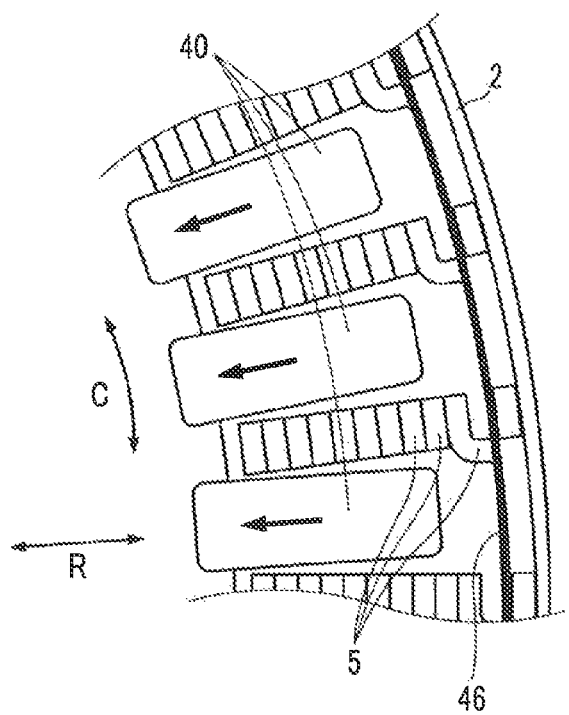
FIG. 14A and FIG. 14B are views showing a state of inserting interphase paper in the state in FIG. 13.
Figure 14B:
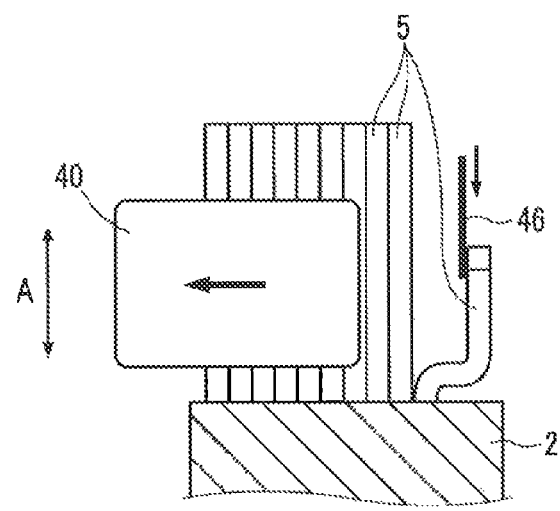

In step S7, interphase paper 46 for insulation between coils of adjacent phases is inserted into the gap between each extension portion 5 of the processing layer subjected to the current bending process and each extension portion 5 of the processing layer subjected to the next bending process according to need, as shown in FIG. 14. This completes the bending process for one processing layer of the conductor layer 6.

Next, in step S8, whether or not the processing layer that has undergone the current bending step (first bending step) is the innermost processing layer in the radial direction R is determined. In the case where the processing layer is not the innermost processing layer, the procedure returns to step S3, and each extension portion 5 belonging to the next processing layer undergoes the next bending step (second bending step) in steps S3 to S6. In the next bending step, each extension portion 5 is bent in the opposite direction to the bending direction of each extension portion 5 in the current bending step, according to need.

Figure 15A:
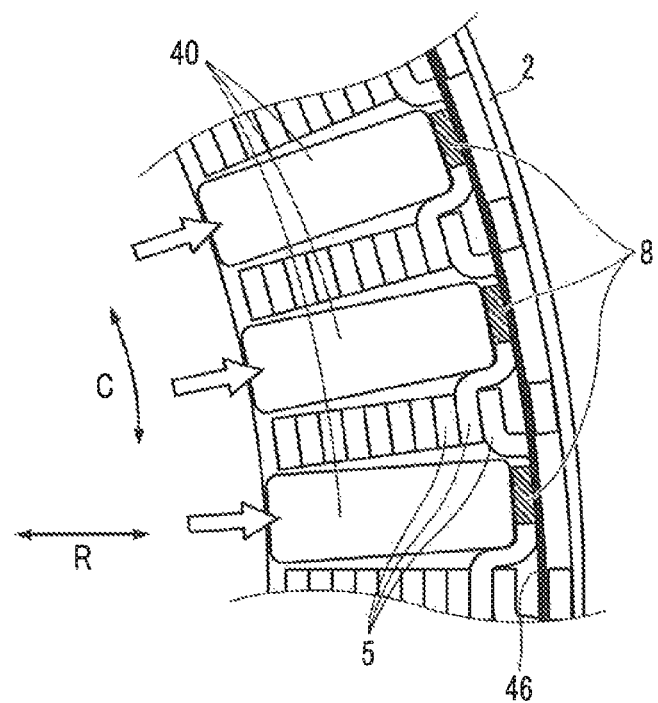
FIG. 15A and FIG. 15B are views showing a state where each extension portion of the second layer is slightly bent in the process in FIG. 7.
Figure 15B:
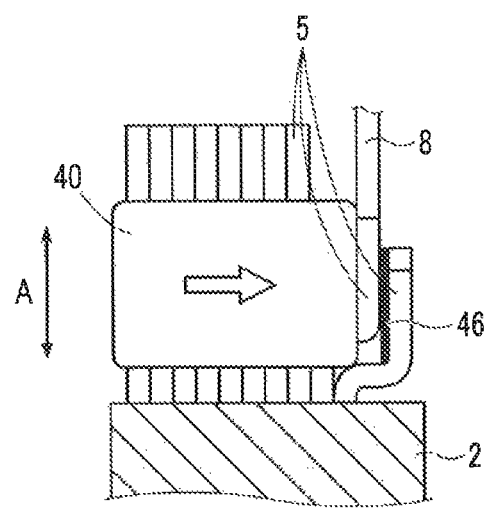

FIG. 15 shows this state where the bending direction is reversed. In detail, the bending direction of the outermost processing layer is clockwise in the circumferential direction C, whereas the bending direction of the next outermost processing layer is counterclockwise in the circumferential direction C. Each extension portion 5 slightly bent in step S4 is shown for the next outermost processing layer.

Figure 16:
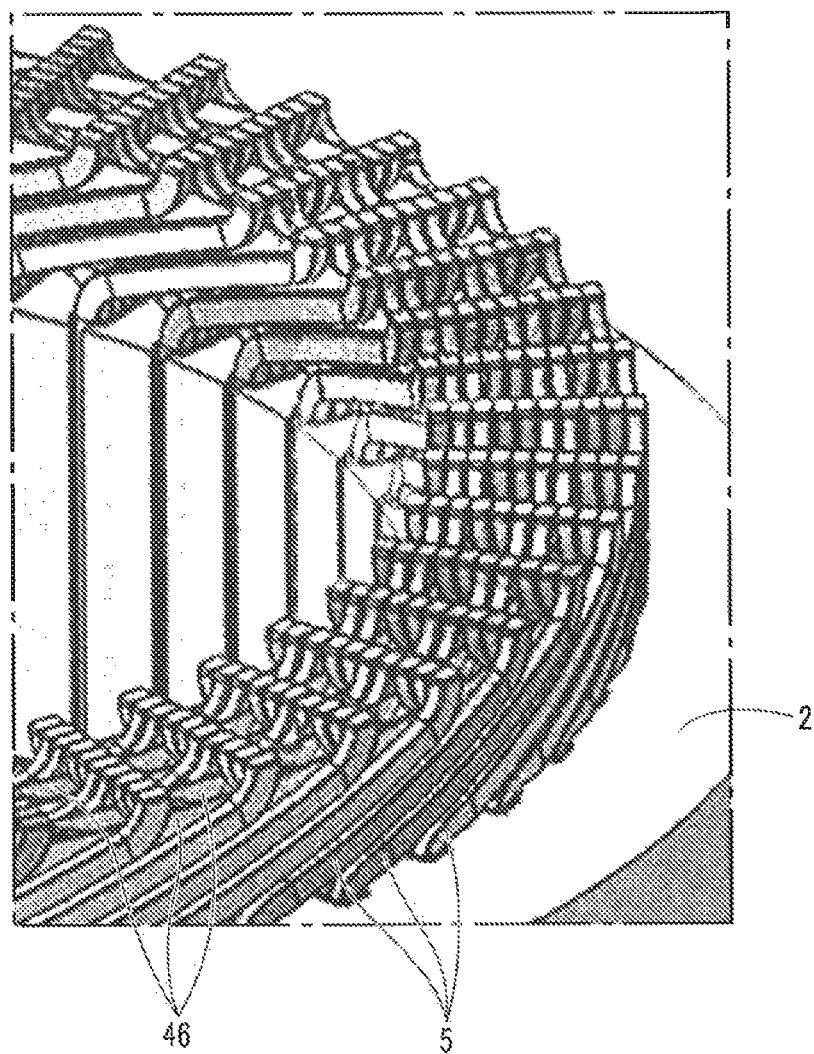
FIG. 16 is a perspective view showing an example of the workpiece on which the process in FIG. 7 has been completed.

In the case where the processing layer that has undergone the current bending step is determined as the innermost processing layer in step S8, the bending process in FIG. 7 ends. FIG. 16 shows an example of the workpiece 1 on which the bending process has been completed. The distal ends of the extension portions 5 are then welded in a predetermined combination in the workpiece 1, thus forming the stator coil.

Here, the width of each gap for inserting the interphase paper 46 can be adjusted to be uniform, by changing the expansion amount in the expansion step for each processing layer.

As described above, according to this embodiment, the engagement portion 8 can be driven in the radial direction R, so that the plurality of extension portions 5 that differ in the extension position in the radial direction can be bent using one engagement portion 8. In addition, workpieces 1 that differ in the extension positions of the extension portions 5 can be processed.

Therefore, in the case of processing various workpieces 1 that differ in the number of extension portions 5 extending from each slot 3 or the extension positions of the extension portions 5, only the setting values or the like need to be changed, with there being no need to change the components of the device. This contributes to high productivity, with no increase in cost. The highly versatile and economical stator manufacturing device 7 can thus be provided.

Moreover, when the engagement portion 8 is driven in the circumferential direction to bend the extension portion 5, the engagement portion 8 can also be driven in the radial direction. Accordingly, even in the case where the extension portion 5 is bent while being expanded in the radial direction R, the state of engagement between the engagement portion 8 and the distal end of the extension portion 5 can be maintained by making the engagement portion 8 follow the distal end of the extension portion 5.

Moreover, the stator manufacturing device 7 includes the axial direction drive portion 11 that drives the engagement portion 8 in the axial direction A. By driving the engagement portion 8 in the axial direction A with the drive amount corresponding to the drive amount of the engagement portion 8 in the circumferential direction C, the extension portion 5 can be bent smoothly while maintaining the state of engagement between the engagement portion 8 and the distal end of the extension portion 5.

Moreover, the radial direction drive portion 10 includes the guide portion 13, the follower portion 14, and the rotary portion 15. Hence, all engagement portions 8 belonging to one processing layer can be simultaneously driven in the radial direction R by a compact and simple structure, with there being no need to provide a drive mechanism for each engagement portion 8.

Moreover, the engagement portion 8 includes: the engagement distal end 23 engageable with the distal end of the extension portion 5; and the distal end support portion 24 that supports the engagement distal end 23 replaceably. This eases the replacement of the distal end of the engagement portion 8 which is prone to wear.

Moreover, the stator manufacturing device 7 includes the support member drive portion 28 that drives the proximal end support member 27 between the support position for supporting the proximal end of the extension portion 5 and the predetermined retraction position. This eases the placement of the proximal end support member 27 at the support position, regardless of the shape of the conductor segment 4 extending from each slot 3.

Moreover, according to this embodiment, the first bending step, the radial movement step, and the second bending step are performed in this order, when bending the first extension portion and the second extension portion as the extension portions 5 extending in the axial direction A respectively from the first extension position and the second extension position which are the extension positions different in the radial direction R, in each slot 3 of the stator core 2.

In detail, in the first bending step, the engagement portion 8 is engaged with the distal end of the first extension portion, and driven in one direction along the circumferential direction C to bend the first extension portion in the one direction. In the radial movement step, the engagement portion 8 is driven in the radial direction R to the position corresponding to the second extension position. In the second bending step, the engagement portion 8 is engaged with the distal end of the second extension portion, and driven in the opposite direction to the one direction to bend the second extension portion in the opposite direction.

The first extension portion and the second extension portion can thus be bent using the same engagement portion 8. In addition, the case of manufacturing various stators that differ in the first extension position and/or the second extension position can be handled.

Therefore, in the case of manufacturing stators that differ in the number of extension portions 5 of conductor segments 4 extending from each slot 3 or the extension positions of the extension portions 5, only the setting values or the like need to be changed, with there being no need to change the components of the device. This contributes to high productivity, with no increase in cost. A highly versatile and economical stator manufacturing method can thus be provided.

Figure 17:
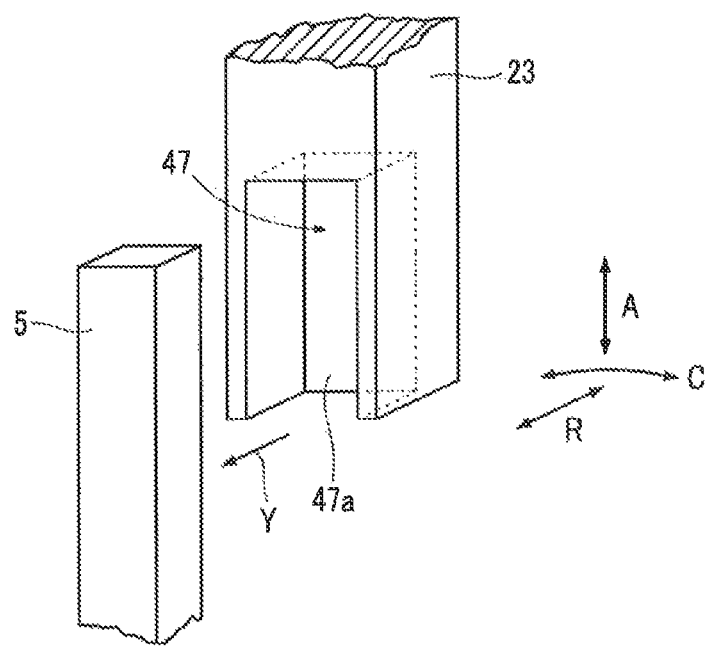
FIG. 17 is a perspective view showing another example of the engagement distal end in the device in FIG. 1.

The present invention is not limited to the foregoing embodiment. For example, the engagement distal end 23 of the engagement portion 8 may have a depression 47 for engaging with the distal end of the extension portion 5 as shown in FIG. 17, instead of the clawlike tip shown in FIG. 4. In such a case, the depression 47 has a rectangular parallelepiped shape that is long in the axial direction A. The respective three pairs of facing surfaces of the rectangular parallelepiped are perpendicular to the axial direction A, the circumferential direction C, and the radial direction R.

One of the facing surfaces perpendicular to the axial direction A is an open surface that is open at the distal end surface of the engagement distal end 23. One of the facing surfaces perpendicular to the radial direction R is an open surface that is open at the surface of the engagement distal end 23 inside in the radial direction R. In other words, the depression 47 is defined by the four surfaces other than these two open surfaces. The size of the depression 47 is slightly larger than the distal end of the extension portion 5 so as to leave a small gap when the distal end of the extension portion 5 fits into the depression 47.

Accordingly, when the engagement distal end 23 positioned with respect to the distal end of the extension portion 5 in the axial direction A and the circumferential direction C is driven inward in the radial direction R as indicated by arrow Y, the engagement distal end 23 and the distal end of the extension portion 5 are fitted together, thus positioning the engagement distal end 23 in the radial direction R, too. Here, an inner wall 47a of the depression 47 perpendicular to the radial direction R is used to position the engagement distal end 23 in the radial direction R.

The engagement distal end 23 positioned in this way is driven along the circumferential direction C, and the position of the engagement distal end 23 in the axial direction A is adjusted according to the amount of movement of the engagement distal end 23 in the circumferential direction C. As a result, the extension portion 5 can be bent as shown in FIGS. 18A to 18C.

Figure 18A:
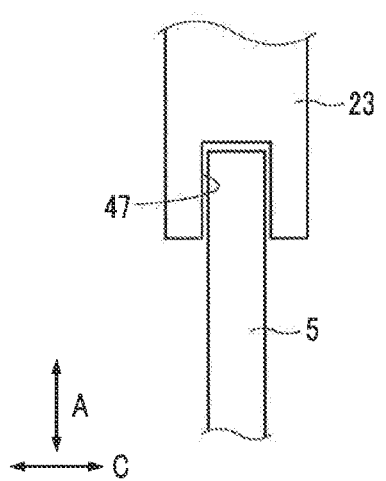
FIG. 18A, FIG. 18B, and FIG. 18C are views showing a state where the extension portion is bent by the engagement distal end in FIG. 17.
Figure 18B:
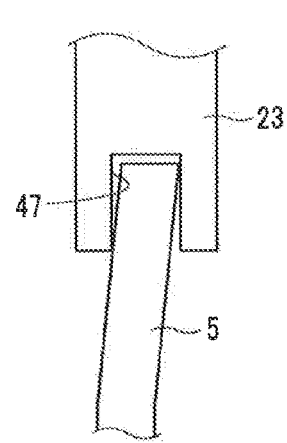
Figure 18C:
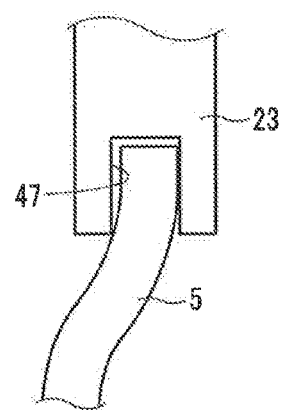

Before the drive in the circumferential direction C starts, there is a gap between the distal end of the extension portion 5 and the depression 47 as shown in FIG. 18A. Once the drive in the circumferential direction C has started, the distal end of the extension portion 5 contacts the depression 47 as shown in FIG. 18B, and a relatively high friction force acts between the distal end and the depression 47 due to the stiffness of the extension portion 5. This enables the distal end to be favorably held by the engagement distal end 23, and the bending of the extension portion 5 to be started smoothly.

The position of the engagement distal end 23 in the axial direction A is adjusted during the bending. Therefore, the distal end of the extension portion 5 is kept from escaping from the depression 47 as shown in FIG. 18C.

INDUSTRIAL APPLICABILITY

The present invention is used to bend conductor segments for forming a stator coil, when manufacturing a stator used in a motor. The present invention can support the manufacture of various stators that differ in the number of conductor segments or the positions of the conductor segments.

DESCRIPTION OF REFERENCE NUMERALS 2 stator core
3 slot 4 conductor segment
5 extension portion
7 stator manufacturing device
8 engagement portion
9 circumferential direction drive portion
10 radial direction drive portion
11 axial direction drive portion
13 guide portion
14 follower portion
15 rotary portion
23 engagement distal end
24 distal end support portion
27 proximal end support member
28 support member drive portion
39 expansion portion
40 pressing member
46 interphase paper

The invention claimed is:

1. A stator manufacturing device configured to bend extension portions of a plurality of conductor segments extending in an axial direction from base portions of the plurality of conductor segments inserted in respective slots of a ring-shaped stator core at a plurality of extension positions that differ in a radial direction of the stator core, the stator manufacturing device comprising:
an engagement portion engageable with a free end of each of the extension portions, at a position corresponding to each of the plurality of extension positions that differ in the radial direction of the stator core;
a circumferential direction drive portion configured to drive the engagement portion engaging with the free end of each of the extension portions in a circumferential direction of the stator core, to bend the extension portions in the circumferential direction with respect to the base portions, while maintaining positions of the base portions in the radial direction; and
a radial direction drive portion configured to drive the engagement portion in the radial direction, to bend the extension portions with respect to the base portions in the radial direction, while maintaining positions of the base portions in the radial direction.

2. The stator manufacturing device according to claim 1, comprising
an axial direction drive portion configured to drive the engagement portion in the axial direction of the stator core.

3. The stator manufacturing device according to claim 1, wherein the radial direction drive portion includes:
a guide portion configured to guide the engagement portion movably in the radial direction;
a follower portion fixed to the engagement portion; and
a rotary portion supported rotatably in the circumferential direction of the stator core, and
wherein the rotary portion has a circular arc cam surface that, when the rotary portion is rotated, acts on the follower portion fixed to the engagement portion to apply a drive force in the radial direction to the engagement portion.

4. The stator manufacturing device according to claim 1, wherein the engagement portion includes:
engagement distal ends each configured to engage with the free end of a corresponding one of the extension portions; and
distal end support portions each configured to support a corresponding one of the engagement distal ends replaceably.

5. The stator manufacturing device according to claim 1, comprising:
a proximal end support member configured to be placed on an end surface of the stator core, and configured to support a proximal end of each of the extension portions during bending of the extension portions in the circumferential direction; and
a support member drive portion configured to drive the proximal end support member in the radial direction between a support position for supporting the proximal end of each of the extension portions and a predetermined retraction position.

6. A stator manufacturing method for bending a first extension portion and a second extension portion of conductor segments extending in an axial direction of a ring-shaped stator core respectively from a first extension position and a second extension position that differ in a radial direction of the stator core, in a slot formed in the stator core, the stator manufacturing method comprising:
a first bending step of engaging an engagement portion with a distal end of the first extension portion, and driving the engagement portion in one direction along a circumferential direction of the stator core to bend the first extension portion in the one direction, the engagement portion being engageable with a distal end of each of the first extension portion and the second extension portion at a position in the radial direction corresponding to the respective first extension position and the second extension position;
a radial direction drive step of, after the first bending step, driving the engagement portion in the radial direction to a position corresponding to the second extension position; and
a second bending step of, after the radial direction drive step, engaging the engagement portion with a distal end of the second extension portion, and driving the engagement portion in an opposite direction to the one direction to bend the second extension portion in the opposite direction.

7. A stator manufacturing method comprising:
an engaging step of engaging an engagement portion with a free end of extension portions of a plurality of conductor segments extending in an axial direction from base portions of the plurality of conductor segments inserted in respective slots of a ring-shaped stator core at a plurality of extension positions that differ in a radial direction of the stator core;
a bending step of driving the engagement portion engaging with the free end of each of the extension portions in a circumferential direction of the stator core, to bend the extension portions in the circumferential direction with respect to the base portions, while maintaining positions of the base portions in the radial direction; and
an expanding step of pressing the extension portions to expand in a radial outer direction of the stator core after the bending step, to bend the extension portions with respect to the base portions in the radial direction, while maintaining positions of the base portions in the radial direction, and then driving the engagement portion to further bend the extension portions in the circumferential direction, while maintaining positions of the base portions in the radial direction.

* * * * *